(12) United States Patent
Umeyama et al.

(10) Patent No.: US 7,187,513 B2
(45) Date of Patent: Mar. 6, 2007

(54) DIFFERENTIAL MAGNETO-RESISTIVE HEAD PRE-AMPLIFIERS FOR SINGLE POLARITY POWER SUPPLY APPLICATIONS

(75) Inventors: Takehiko Umeyama, Tokyo (JP); Robert B. Ross, Raleigh, NC (US); Masashige Tada, Tokyo (JP)

(73) Assignee: Renesas Technology America, Inc., Cypress, CA (US)

( * ) Notice: Subject to any disclaimer, the term of this patent is extended or adjusted under 35 U.S.C. 154(b) by 351 days.

(21) Appl. No.: 10/172,368

(22) Filed: Jun. 14, 2002

(65) Prior Publication Data

US 2003/0231419 A1    Dec. 18, 2003

(51) Int. Cl.
*G11B 5/03* (2006.01)
(52) U.S. Cl. .................................................. 360/66
(58) Field of Classification Search .................. 360/66, 360/67, 60; 330/61 R, 62; 324/210, 212
See application file for complete search history.

(56) References Cited

U.S. PATENT DOCUMENTS

| | | | |
|---|---|---|---|
| 3,902,191 A | | 8/1975 | Lynn |
| 3,972,003 A | * | 7/1976 | Schroeder .................... 330/261 |
| 4,492,997 A | * | 1/1985 | Arai et al. ...................... 360/67 |
| 5,122,915 A | | 6/1992 | Klein et al. |
| 5,327,303 A | | 7/1994 | Smith |
| 5,444,579 A | | 8/1995 | Klein et al. |
| 5,543,979 A | | 8/1996 | Davies |
| 5,691,663 A | | 11/1997 | Nayebi et al. |
| 5,703,528 A | * | 12/1997 | Nebuloni et al. ............... 330/51 |
| 5,708,376 A | * | 1/1998 | Ikeda ......................... 330/107 |
| 5,757,566 A | * | 5/1998 | Ngo et al. ..................... 360/67 |
| 5,793,551 A | * | 8/1998 | Ngo et al. ..................... 360/67 |
| 5,877,911 A | | 3/1999 | Klaassen et al. |
| 5,912,583 A | * | 6/1999 | Pierson et al. ............... 327/553 |
| 5,939,940 A | | 8/1999 | Patti |
| 5,969,896 A | * | 10/1999 | Nakamoto et al. ............ 360/66 |
| 5,986,840 A | * | 11/1999 | Tada et al. ..................... 360/67 |
| 6,054,901 A | | 4/2000 | Nainar et al. |
| 6,066,987 A | | 5/2000 | Lorenz |
| 6,084,469 A | | 7/2000 | Lorenz |
| 6,107,873 A | | 8/2000 | Lorenz |
| 6,150,876 A | | 11/2000 | Ngo |
| 6,175,276 B1 | | 1/2001 | Lorenz |
| 6,219,195 B1 | | 4/2001 | Jusuf et al. |
| 6,222,415 B1 | * | 4/2001 | Umeyama et al. ............ 360/67 |

(Continued)

*Primary Examiner*—Wayne Young
*Assistant Examiner*—Glenda P. Rodriguez
(74) *Attorney, Agent, or Firm*—Buchanan Ingersoll & Rooney, PC

(57) ABSTRACT

Magneto-resistive (MR) head pre-amplifiers for single polarity power supply applications are presented. An exemplary pre-amplifier includes a bias network coupled to first and second input terminals of the pre-amplifier, the input terminals for receiving signals corresponding to variations in magnetic fields from an MR head. At least one gain stage having first and second input terminals and first and second output terminals for amplifying the received signals is included. A pair of coupling capacitors, each capacitor being connected between a respective input terminal of the pre-amplifier and a corresponding respective input terminal of the at least one gain stage, are further included in the pre-amplifier design. Finally, the exemplary pre-amplifier includes a pair of feedback capacitors, each capacitor being connected between respective input and output terminals of the at least one gain stage. The pre-amplifier is powered by a single polarity power supply.

21 Claims, 2 Drawing Sheets

U.S. PATENT DOCUMENTS

| | | |
|---|---|---|
| 6,252,457 B1 * | 6/2001 | Umeyama et al. ............ 360/67 |
| 6,252,735 B1 | 6/2001 | Chung et al. |
| 6,275,347 B1 | 8/2001 | Ngo et al. |
| 6,532,127 B1 * | 3/2003 | Ranmuthu et al. ............ 360/66 |
| 6,734,905 B2 * | 5/2004 | Fossum et al. ............. 348/300 |
| 2002/0079959 A1 * | 6/2002 | Nair et al. .................... 330/69 |

* cited by examiner

DIFFERENTIAL MAGNETO-RESISTIVE HEAD PRE-AMPLIFIERS FOR SINGLE POLARITY POWER SUPPLY APPLICATIONS

BACKGROUND

What is described are magneto-resistive (MR) head pre-amplifier designs for use with hard disk drives (HDDs). In particular, differential MR head pre-amplifiers for use with single polarity power supply applications are presented.

MR heads operate based on a physical phenomenon known as the magneto-resistive effect. Certain metals, when exposed to a magnetic field, change their resistance to the flow of electricity. This property has been exploited in creating heads for reading data stored in the HDDs.

Conventional HDDs include magnetic rotating disks (or platters) that are typically made of glass or ceramic, and have a layer of magnetic material deposited on their surface. Data is stored on the platters in the form of binary digits sent to the HDD in a time sequence of binary "one" and "zero" values, or bits. Areas of the rotating platters are magnetized in opposite directions depending on the data to be stored. A typical data storage scheme results in "ones" being represented by reversals in magnetic polarization stored on the surface of the platters, with "zeroes" being stored in areas of the platters between the areas where the "one" values are stored.

In conventional HDDs, an MR head is arranged in close proximity to the rotating platters to read the magnetically stored data. Typically, a bias current generator supplies a constant bias current to the MR head. When the MR head passes over a magnetic field on one of the rotating platters, the head changes its resistance. As the bias current is fixed, variations in the resistance of the MR head lead to corresponding changes in the voltage produced across the MR head. Typically, a read pre-amplifier is coupled to the MR head to amplify the relatively small voltage produced across the MR head to an appropriate level for use by other components in the HDD assembly. Pre-amplifiers having a gain of more than a hundred are typical.

MR head pre-amplifier designs may be grouped broadly into two main categories: differential and single-ended pre-amplifier designs. In differential designs, each terminal of the MR head is fed to respective inputs of the amplifier. In contrast, single-ended designs have only one terminal of the MR head being fed to the single amplifier input (see, e.g., U.S. Pat. No. 6,219,195).

Differential MR head pre-amplifiers typically exhibit superior common-mode noise rejection (CMNR) characteristics over their counterpart single-ended designs. Noise signals typically occur equally at both terminals of the MR head, and tend to cancel one another out in differential designs. With single-ended designs, the unwanted noise signals are amplified by the read pre-amplifier, possibly resulting in errors in the recovered data. CMNR is thus an important design characteristic in establishing the maximum performance capability of the HDD.

A drawback of differential pre-amplifier designs is that the amplifiers typically require both a positive and negative power supply in order to maintain a differential MR head voltage potential that is near zero volts. Typically, the nominal differential head voltage is chosen to be about ±100 mV. Maintaining a near-zero head potential is important to protecting the sensitive MR head from electrical damage should the head come into contact with the platters during operation. But having both a positive and negative power supply adds significant cost and design complexity to the overall HDD design.

The added cost and complexity mainly result from the need to provide the HDD with an additional voltage regulator for generating the negative supply voltage. Typically, all other components in the HDD are capable of being biased using only a positive power supply voltage. Thus, there is a need for a differential pre-amplifier design that maintains the MR head voltage near zero volts without requiring a negative power supply voltage.

Another design constraint associated with MR head pre-amplifier design results from passing a constant bias current through the MR head. This bias current consequently produces a relatively large DC bias voltage (e.g., hundreds of millivolts) across the MR head that tends to saturate the input(s) of the pre-amplifier. Conventionally, coupling capacitors are arranged between the MR head terminal(s) and the amplifier input(s) to remove the DC component of the MR head voltage (see, e.g., U.S. Pat. Nos. 6,219,195 and 6,252,735).

But the relatively large magnitude of these coupling capacitors, and their associated parasitic capacitances, can produce undesired gain peaking in the frequency response of the amplifier. Gain peaking tends to increase the bandwidth of the closed-loop system at the expense of decreased circuit stability. The coupling capacitors can also introduce so-called corner frequencies into the frequency response of the amplifier, causing the gain to roll off below these frequencies. U.S. Pat. No. 6,084,460 describes a differential MR pre-amplifier having an arrangement that compensates for corner frequency roll off, but fails to address the problem of gain peaking. Thus, there is also a need for a single-supply differential pre-amplifier design that is AC-coupled to the MR head, but having a lowered input capacitance to reduce the effect of gain peaking in the frequency response of the amplifier.

SUMMARY

Accordingly, one object is to provide a differential pre-amplifier that maintains the MR head voltage near zero volts without requiring a negative power supply voltage. Another object is to provide a single-supply differential pre-amplifier design that is ac-coupled to the MR head, but has a lowered input capacitance to reduce the effect of gain peaking in the frequency response of the amplifier. These objects are addressed by novel and inventive MR head pre-amplifier designs capable of operating in single polarity power supply systems.

According to one aspect, an MR head pre-amplifier includes a bias network coupled to first and second input terminals of the pre-amplifier, the input terminals for receiving signals corresponding to variations in magnetic fields from an MR head; at least one gain stage having first and second input terminals and first and second output terminals for amplifying the received signals; a pair of coupling capacitors, each capacitor being connected between a respective input terminal of the pre-amplifier and a corresponding respective input terminal of the at least one gain stage; and a pair of feedback capacitors, each capacitor being connected between respective input and output terminals of the at least one gain stage. The pre-amplifier is powered by a single polarity power supply.

According to a related aspect, the bias network includes a voltage source having a first terminal connected to a ground plane. A first resistor having a first terminal connected to a second terminal of the voltage source and a second terminal connected the first input terminal of the pre-amplifier is included. Also, the bias network includes a second resistor having a first terminal connected to the second input terminal of the pre-amplifier and a second terminal connected to the ground plane.

According to another related aspect, the bias network establishes a nominal voltage of about +400 mV at the first input terminal of the pre-amplifier and a nominal voltage of about +200 mV at the second input terminal of the pre-amplifier to produce a nominal differential input voltage of about +200 mV.

According to yet another related aspect, the coupling capacitors block a DC component of a differential input voltage present at the input terminals of the preamplifier from reaching the input terminals of the at least one gain stage.

According to yet another related aspect, the feedback capacitors reduce an overall input capacitance present at the input terminals of the pre-amplifier, including a portion of the input capacitance contributed by the coupling capacitors.

According to yet another related aspect, additional gain stages are cascaded at the output terminals of the at least one gain stage.

According to yet another related aspect, the at least one gain stage is an open-loop differential amplifier.

According to yet another related aspect, the value of each of the coupling capacitors is about 50 pF to 100 pF. The value of each of the feedback capacitors is about 0.5 pF to 1.5 pF.

According to a second aspect, an MR head pre-amplifier includes a bias network coupled to first and second input terminals of the pre-amplifier, the input terminals for receiving signals corresponding to variations in magnetic fields from an MR head. An amplifier stage having input terminals each coupled to respective output terminals of the bias network is also included. In addition, at least one gain stage having first and second input terminals and first and second output terminals is included. Finally, the pre-amplifier includes a pair of coupling capacitors, each capacitor being connected between a respective output terminal of the amplifier stage and a respective input terminal of the at least one gain stage. The pre-amplifier is powered by a single polarity power supply.

According to a related aspect, the bias network includes a pair of bias legs, each leg including a voltage source having a first terminal connected to a ground plane; a first resistor having a first terminal connected to a second terminal of the voltage source and a second terminal connected to a respective input terminal of the amplifier stage; and a diode having a first terminal connected to the second terminal of the first resistor and a second terminal connected to a respective input terminal of the preamplifier.

According to another related aspect, the MR head pre-amplifier further includes a second resistor having a first terminal connected to the second input terminal of the pre-amplifier and a second terminal connected to the ground plane.

According to yet another related aspect, the first and second bias networks and second resistor establish a nominal voltage of about +400 mV at the first input terminal of the pre-amplifier and a nominal voltage of about +200 mV at the second input terminal of the pre-amplifier to produce a nominal differential input voltage of about +200 mV.

According to yet another related aspect, the nominal differential input voltage of the pre-amplifier is substantially similar to a nominal differential voltage present at the output terminals of the amplifier stage.

According to yet another related aspect, the diode in each leg of the bias network comprises a diode-connected transistor of a same type as a transistor having an input terminal forms a respective input terminal of the amplifier stage.

According to yet another related aspect, the amplifier stage includes a pair of amplifier legs, each leg including a transistor biased by a power supply, and having an input terminal that forms a respective input terminal of the amplifier stage and an output terminal that forms a respective output terminal of the amplifier stage; and a current source connected between the output terminal of the transistor and the ground plane.

According to yet another related aspect, the coupling capacitors block a DC component of a differential input voltage present at the input terminals of the preamplifier from reaching the input terminals of the at least one gain stage.

According to yet another related aspect, the bias network and amplifier stage cooperate to reduce an overall input capacitance present at the input terminals of the pre-amplifier, including a portion of the input capacitance contributed by the coupling capacitors.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above objects, features, and advantages will become more apparent in light of the following detailed description in conjunction with the drawings, in which like reference numerals identify similar or identical elements, and in which.

DETAILED DESCRIPTION

Preferred embodiments are described below with reference to the accompanying drawings. In the following description, well-known functions and/or constructions are not described in detail to avoid obscuring the description in unnecessary detail.

Figure 1:
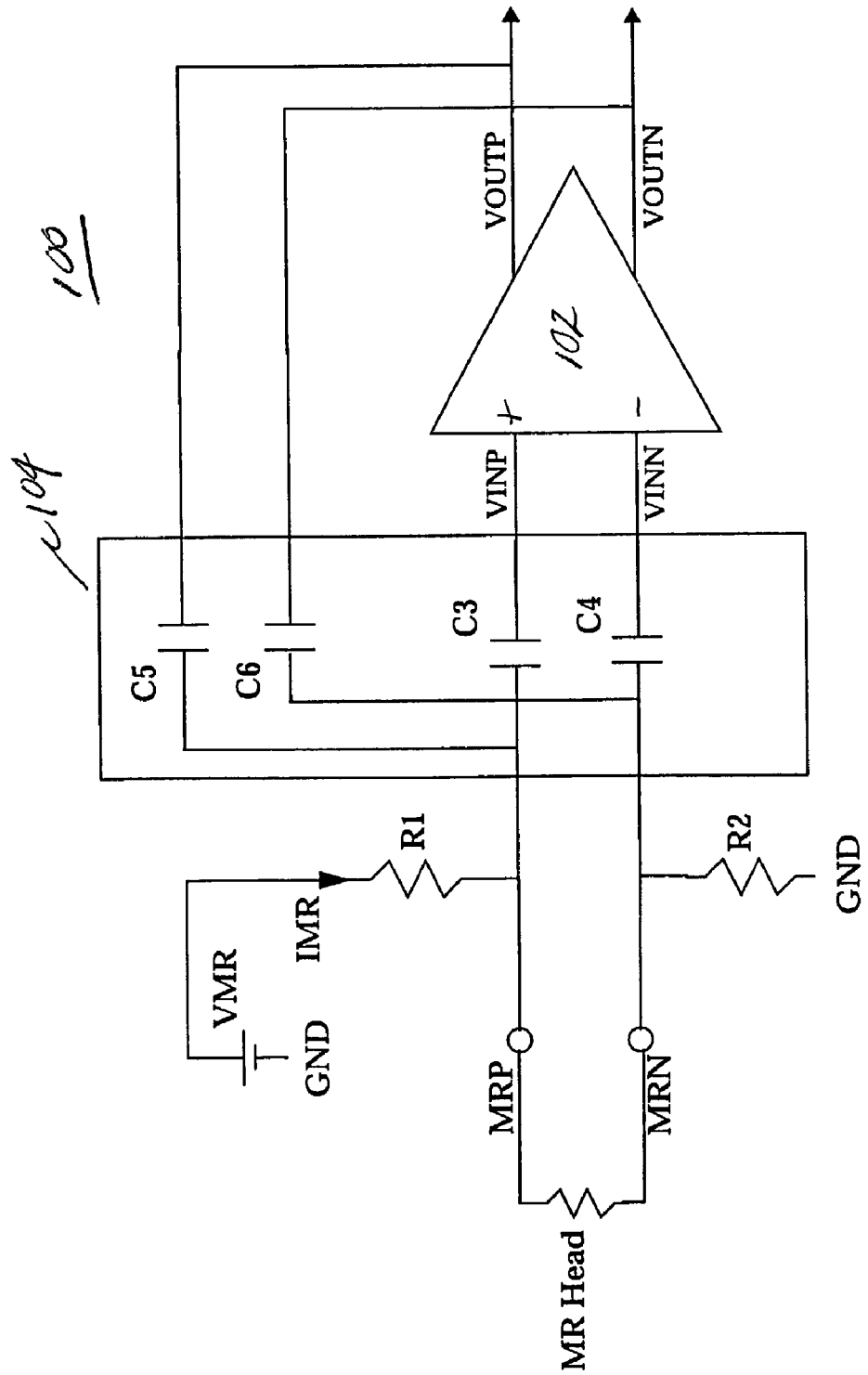
FIG. 1 is a schematic of an MR head differential pre-amplifier according to a first exemplary embodiment.

FIG. 1 shows a schematic of an MR head differential pre-amplifier according to a first exemplary embodiment. Nodes MRP and MRN are the positive and negative terminals of the pre-amplifier 100 input, respectively. These nodes connect to the positive and negative terminals, respectively, of the MR head. A first resistor R1 has a first terminal connected to a voltage source VMR and a second terminal connected to positive input terminal MRP of the pre-amplifier 100. A second resistor R2 has a first terminal connected to the negative input terminal MRN of the pre-amplifier 100, and a second terminal connected to a ground plane GND.

The voltage source VMR and first and second resistors R1, R2 form a bias network that, together with resistance of the MR head, determine the nominal differential bias voltage across the head terminals MRP and MRN. As discussed above, when the MR head is passed over the platters of the HDD, the magnetized platters change the resistance of the head. These variations in the resistance of the MR head change the voltage-divider formed by the bias resistors R1, R2 and the MR head, which in turn causes the voltage produced across the MR head to vary. These variations in voltage are then amplified for further use by other circuitry in the preamplifier 100.

The values of the voltage source VMR and bias resistors R1, R2 are chosen so as to balance the various HDD design constraints. Recall that it is important that the nominal differential head bias, in particular the voltage at the first head terminal MRP, be as close to zero volts as possible, in order to avoid damaging the HDD should the head come into contact with the platters. Still, the nominal differential head bias and variation in head resistance with changing magnetic field must be great enough that the differential head voltage can be accurately amplified by the remaining circuitry of the HDD assembly. Biasing the positive terminal MRP of the MR head at about +400 mV and the negative terminal MRP of the MR head at about +200 mV to produce a +200 mV nominal differential head voltage, has been found to balance these design constraints well.

Recall that having a nominal differential head voltage of a couple hundred of millivolts can saturate the inputs of the pre-amplifier. To address this concern, coupling capacitors C3, C4 are connected between the positive and negative MR head terminals MRP, MRN and corresponding positive and negative inputs VINP, VINN of a first differential gain stage 102 of the pre-amplifier. The differential gain stage 102 may be an open-loop differential amplifier, an operational amplifier, or may be of any other type of conventional amplifier design. The gain stage 102 has corresponding positive and negative outputs terminals VOUTP, VOUTN. Additional gain stages (not shown) may be added to the pre-amplifier 100 to produce the overall desired gain.

Values for the coupling capacitors C3, C4 should be chosen so as to adequately block the DC component of the MR head voltage from saturating the inputs of the first gain stage 102. Typical values for the coupling capacitance is about 50 pF to 100 pF, but this range can vary depending on the desired frequency response of the pre-amplifier. Typically, the coupling capacitors C3, C4 are integrated onto the same integrated circuit (IC) chip as the pre-amplifier. Consequently, the integrated devices have associated parasitic capacitances from each of the terminals of the capacitors to, e.g., the ground plane of the IC. These parasitic capacitances combine with the inductance of the MR head and resistance of the bias resistors R1, R2 to produce a resonant pole in the frequency response of the pre-amplifier 100. As discussed above, this pole can cause undesired gain peaking to occur in the response, which in turn can cause the pre-amplifier 100 to become unstable.

To address this concern, a positive feedback network 104 is provided including feedback capacitors C5, C6. Typical values for the feedback capacitance is about 0.5 pF to 1.5 pF, but again these values may vary depending on the operational requirements of the pre-amplifier. The feedback capacitors C5, C6 are connected between the positive and negative output terminals VOUTP, VOUTN of the first gain stage 102 and to the corresponding positive and negative MR head terminals MRP, MRN. The feedback network 104 introduces a zero into the overall frequency response of the pre-amplifier that at least partially cancels the resonant pole formed by the parasitic capacitances, MR head inductance, and resistance of the bias resistors R1, R2. This, in turn, reduces the amount of gain peaking in the frequency response.

Thus, the bias network (including the voltage source VMR and bias resistors R1, R2), coupling capacitors C3, C4, and the positive feedback network 104, combine to produce a pre-amplifier 100 requiring a single polarity power supply, and free from the gain peaking, input saturation, and HDD damage concerns present in conventional MR head pre-amplifier designs.

Figure 2:
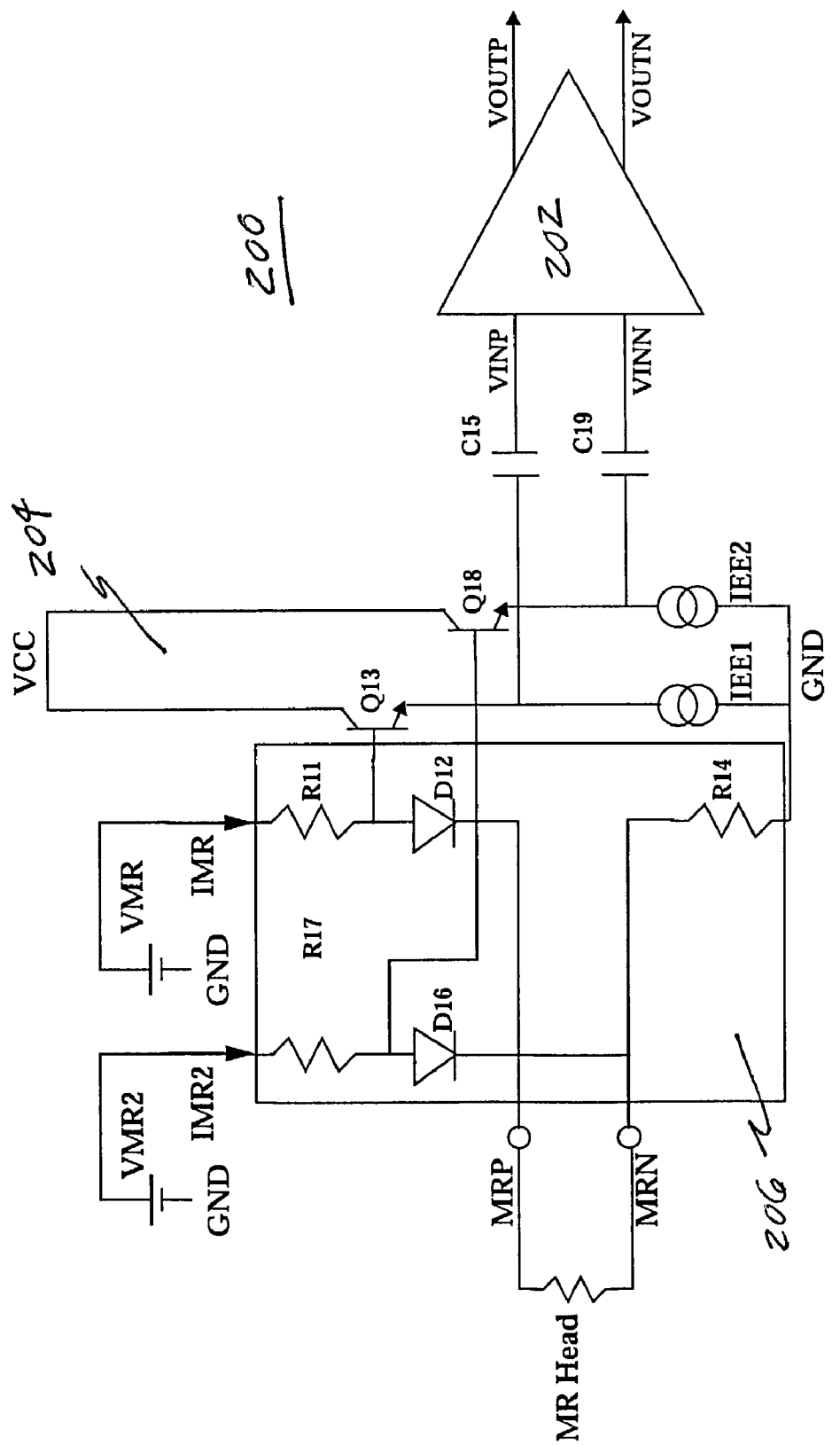
FIG. 2 is a schematic of an MR head differential pre-amplifier according to a second exemplary embodiment.

FIG. 2 shows a schematic of an MR head differential pre-amplifier according to a second exemplary embodiment. Like the exemplary embodiment shown in FIG. 1, nodes MRP and MRN are the positive and negative terminals of the pre-amplifier 200 input, respectively. These nodes connect to the positive and negative terminals, respectively, of the MR head. Separate bias networks 206 provide the nominal head bias voltage values at the input nodes MRP, MRN to determine the nominal differential head voltage.

A first bias network determines the nominal voltage value at the positive head terminal MRP. The first bias network includes a first voltage source VMR having a first terminal connected to a ground plane GND and a second terminal connected to a first resistor R11. A second terminal of the first resistor R11 is connected to a first diode D12, which in turn has its second terminal connected to the positive head terminal MRP.

A second bias network determines the nominal voltage value at the negative head terminal MRN. The second bias network includes a second voltage source VMR2 having a first terminal connected to the ground plane GND and a second terminal connected to a second resistor R17. A second terminal of the second resistor R17 is connected to a second diode D16, which in turn has its second terminal connected to the negative head terminal MRN.

A third resistor R14 has its first terminal connected to the negative head terminal MRN and its second terminal connected to the ground plane GND. The third resistor R14 provides a return ground path for both current flowing through the MR head and first bias network, and for current flowing through the second bias network.

The values of the voltage sources VMR, VMR2, bias resistors R11, R17, R17, and diodes D12, D16 are again chosen so as to balance the various HDD design constraints. Again, values for these devices are chosen such that the positive terminal MRP of the MR head is about +400 mV and the negative terminal MRP of the MR head is about +200 mV, resulting in a +200 mV nominal differential head voltage.

Unlike the exemplary embodiment shown in FIG. 1, the pre-amplifier 200 shown in FIG. 2 does not have its head terminals MRP, MRN directly tied to the gain stage(s) of the pre-amplifier. Instead, the head terminals MRP, MRN are coupled to the gain stage(s) through the diodes D12, D16 and amplifier stage 204. The amplifier stage 204 and diodes D12, D16 shield (or buffer) the head terminals MRP, MRN from remaining circuitry of the pre-amplifier 200.

The amplifier stage 204 is preferably a dual emitter-follower (or source-follower) configuration, with each leg of the amplifier including a transistor Q13, Q18 having its base terminal tied to the first terminal of the corresponding diode D12, D16. The diodes D12, D16 are preferably diode-connected transistors of the same type as the transistors Q13, Q18 of the amplifier stage 204. With such an arrangement, the diodes D12, D16 and transistors Q13, Q18 operate as a level-shifter, causing the voltage values present at the positive and negative head terminals MRP, MRN to be substantially similar to the voltage values presented at the emitter terminals of the transistors Q13, Q18. The diode-connected arrangement also helps to eliminate any process or temperature variations that may occur in the diodes D12, D16 or transistors Q13, Q18, as such variations will tend to track between these devices and cancel one another out.

The collector terminal of the transistors Q13, Q18 are each tied to a single polarity power supply VCC for the pre-amplifier 200. The emitter terminal of the transistors Q13, Q18 are connected to respective current sources IEE1, IEE2, which determine the quiescent operating points to the amplifier legs. The emitter terminals, which mirror the voltages present at the head terminals MRP, MRN, are also connected to coupling capacitors C15, C19. The coupling capacitors C15, C19 are also connected to corresponding positive and negative inputs VINP, VINN of a first differential gain stage 202 of the pre-amplifier 200.

As in the arrangement shown in FIG. 1, the coupling capacitors C15, C19 block the DC component of the differential head voltage to prevent saturation of the first gain stage 202. Again, the differential gain stage 202 may be an open-loop differential amplifier, an operational amplifier, or may be of any other type of conventional amplifier design. The gain stage 202 has corresponding positive and negative outputs terminals VOUTP, VOUTN. Additional gain stages (not shown) may be added to the preamplifier 200 to produce the overall desired gain.

The bias networks 206 and amplifier stage 204 together form a buffer between the coupling capacitors C15, C19 and the MR head. Consequently, the parasitic capacitances associated with the coupling capacitors C15, C19 and the differential gain stage 202 do not combine with the inductance of the MR head to produce a resonant pole in the frequency response of the pre-amplifier 200. Thus, the concern of gain peaking in the amplifier response is reduced by the buffering arrangement without having to add the positive feedback network associated with the arrangement of FIG. 1. Moreover, the differential pre-amplifier 200 again requires only a single polarity power supply VCC, and is free from the input saturation and HDD damage concerns present in conventional MR head pre-amplifier designs.

The phrase "single polarity power supply" is used throughout the written description and claims. Those skilled in the art will understand that this phrase does not limit the scope of the invention only to arrangements having a single power supply. Arrangements are contemplated where more than one power supply may be used, but while each of these power supplies may have a different magnitude, they will all have the same polarity (i.e., either positive or negative with respect to ground or zero volts).

Although various exemplary embodiments have been described, it will be understood by those of ordinary skill in this art that these embodiments are merely illustrative and that many other embodiments are possible. The intended scope of the invention is defined by the following claims rather than the preceding description, and all variations that fall within the scope of the claims are intended to be embraced therein.

What is claimed is:

1. A magneto-resistive (MR) head pre-amplifier, comprising:
   a bias network coupled to first and second input terminals of the pre-amplifier, the input terminals for receiving signals corresponding to variations in magnetic fields from an MR head;
   at least one gain stage having first and second input terminals and first and second output terminals for amplifying the received signals;
   a pair of coupling capacitors, each capacitor being connected between a respective input terminal of the pre-amplifier and a corresponding respective input terminal of the at least one gain stage; and
   a pair of feedback capacitors, each capacitor being connected between respective input terminals of the pre-amplifier at which said signals are received from the MR head and output terminals of the at least one gain stage;
   wherein the pre-amplifier is powered by a single polarity power supply.

2. The MR head pre-amplifier of claim 1, wherein the bias network comprises:
   a voltage source having a first terminal connected to a ground plane;
   a first resistor having a first terminal connected to a second terminal of the voltage source and a second terminal connected the first input terminal of the preamplifier; and
   a second resistor having a first terminal connected to the second input terminal of the pre-amplifier and a second terminal connected to the ground plane.

3. The MR head pre-amplifier of claim 2, wherein the bias network establishes a nominal voltage of about +400 mV at the first input terminal of the preamplifier and a nominal voltage of about +200 mV at the second input terminal of the pre-amplifier to produce a nominal differential input voltage of about +200 mV.

4. The MR head pre-amplifier of claim 1, wherein the coupling capacitors block a DC component of a differential input voltage present at the input terminals of the pre-amplifier from reaching the input terminals of the at least one gain stage.

5. The MR head pre-amplifier of claim 1, wherein the feedback capacitors reduce an overall input capacitance present at the input terminals of the pre-amplifier, including a portion of the input capacitance contributed by the coupling capacitors.

6. The MR head pre-amplifier of claim 1, wherein additional gain stages are cascaded at the output terminals of the at least one gain stage.

7. The MR head pre-amplifier of claim 1, wherein the at least one gain stage is an open-loop differential amplifier.

8. The MR head pre-amplifier of claim 1, wherein the value of each of the coupling capacitors is about 50 pF to 100 pF.

9. The MR head pre-amplifier of claim 1, wherein the value of each of the feedback capacitors is about 0.5 pF to 1.5 pF.

10. A magneto-resistive (MR) head pre-amplifier, comprising:
    a bias network coupled to first and second input terminals of the preamplifier, the input terminals for receiving signals corresponding to variations in magnetic fields from an MR head;
    an amplifier stage having input terminals each coupled to respective output terminals of the bias network;
    at least one gain stage having first and second input terminals and first and second output terminals; and
    a pair of coupling capacitors, each capacitor being connected between a respective output terminal of the amplifier stage and a respective input terminal of the at least one gain stage;
    wherein the pre-amplifier is powered by a single polarity power supply.

11. The MR head pre-amplifier of claim 10, wherein the bias network comprises a pair of bias legs, each leg comprising:

a voltage source having a first terminal connected to a ground plane;

a first resistor having a first terminal connected to a second terminal of the voltage source and a second terminal connected to a respective input terminal of the amplifier stage; and a diode having a first terminal connected to the second terminal of the first resistor and a second terminal connected to a respective input terminal of the preamplifier.

12. The MR head pre-amplifier of claim 11, further comprising a second resistor having a first terminal connected to the second input terminal of the preamplifier and a second terminal connected to the ground plane.

13. The MR head pre-amplifier of claim 12, wherein the first and second bias networks and second resistor establish a nominal voltage of about +400 mV at the first input terminal of the pre-amplifier and a nominal voltage of about +200 mV at the second input terminal of the pre-amplifier to produce a nominal differential input voltage of about +200 mV.

14. The MR head pre-amplifier of claim 13, wherein the nominal differential input voltage of the pre-amplifier is substantially similar to a nominal differential voltage present at the output terminals of the amplifier stage.

15. The MR head pre-amplifier of claim 14, wherein the diode in each leg of the bias network comprises a diode-connected transistor of a same type as a transistor having an input terminal forms a respective input terminal of the amplifier stage.

16. The MR head pre-amplifier of claim 10, wherein the amplifier stage comprises a pair of amplifier legs, each leg comprising:

a transistor biased by a power supply, and having an input terminal that forms a respective input terminal of the amplifier stage and an output terminal that forms a respective output terminal of the amplifier stage; and a current source connected between the output terminal of the transistor and the ground plane.

17. The MR head pre-amplifier of claim 10, wherein the coupling capacitors block a DC component of a differential input voltage present at the input terminals of the pre-amplifier from reaching the input terminals of the at least one gain stage.

18. The MR head pre-amplifier of claim 10, wherein the bias network and amplifier stage cooperate to reduce an overall input capacitance present at the input terminals of the pre-amplifier, including a portion of the input capacitance contributed by the coupling capacitors.

19. The MR head pre-amplifier of claim 10, wherein additional gain stages are cascaded at the output terminals of the at least one gain stage.

20. The MR head pre-amplifier of claim 10, wherein the at least one gain stage is an open-loop differential amplifier.

21. The MR head pre-amplifier of claim 10, wherein the value of each of the coupling capacitors is about 50 pF to 100 pF.

* * * * *